United States Patent
Kimura

(10) Patent No.: US 7,154,654 B2
(45) Date of Patent: Dec. 26, 2006

(54) TRANSMISSIVE SPATIAL LIGHT MODULATOR AND METHOD OF MANUFACTURING THE SAME

(75) Inventor: Koichi Kimura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/849,263

(22) Filed: May 20, 2004

(65) Prior Publication Data

US 2004/0233503 A1 Nov. 25, 2004

(30) Foreign Application Priority Data

May 23, 2003 (JP) .............................. 2003-146560

(51) Int. Cl.
*G02B 26/00* (2006.01)

(52) U.S. Cl. .................................... 359/237

(58) Field of Classification Search ................ 359/237, 359/223, 224, 288, 302, 290, 291, 292, 621, 359/622, 623; 257/347; 438/311; 349/95, 349/42, 110, 153, 154, 190
See application file for complete search history.

(56) References Cited

U.S. PATENT DOCUMENTS

| | | | | | |
|---|---|---|---|---|---|
| 5,062,689 | A | * | 11/1991 | Koehler | 359/230 |
| 5,745,281 | A | * | 4/1998 | Yi et al. | 359/290 |
| 5,771,321 | A | * | 6/1998 | Stern | 385/31 |
| 6,172,797 | B1 | * | 1/2001 | Huibers | 359/291 |
| 6,330,047 | B1 | * | 12/2001 | Kubo et al. | 349/147 |
| 6,377,233 | B1 | * | 4/2002 | Colgan et al. | 345/98 |
| 6,498,685 | B1 | * | 12/2002 | Johnson | 359/626 |
| 6,970,212 | B1 | * | 11/2005 | Gomi | 349/95 |

FOREIGN PATENT DOCUMENTS

| | | | |
|---|---|---|---|
| JP | 7-311391 | A | 11/1995 |
| JP | 9-510797 | A | 10/1997 |
| JP | 10-39239 | A | 2/1998 |
| JP | 2002-214543 | A | 7/2002 |

\* cited by examiner

*Primary Examiner*—Hung Xuan Dang
*Assistant Examiner*—Tuyen Tra
(74) *Attorney, Agent, or Firm*—Sughrue Mion, PLLC

(57) ABSTRACT

A transmissive spatial light modulator having a light-transmission area, comprises: a transparent substrate; a pixel drive circuit provided on the transparent substrate to form an area other than the light-transmission area; and a transmissive light modulation section including a micro-electromechanical element, the transmissive light modulation section being controlled by the pixel drive circuit and being provided above the pixel drive circuit.

15 Claims, 9 Drawing Sheets

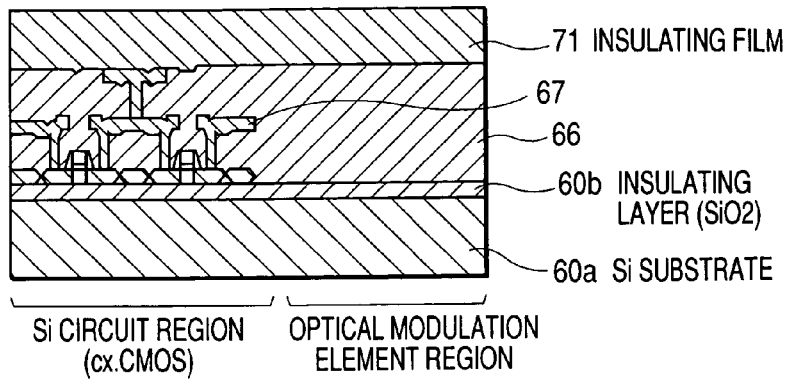
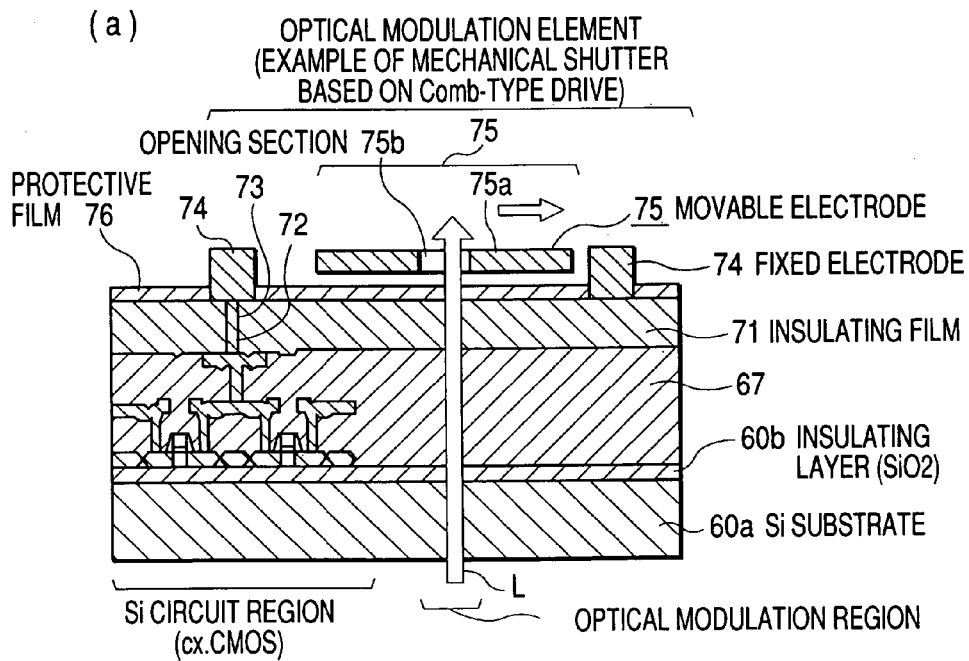
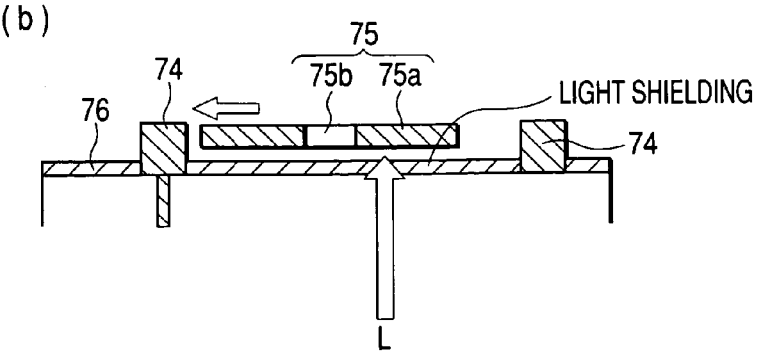

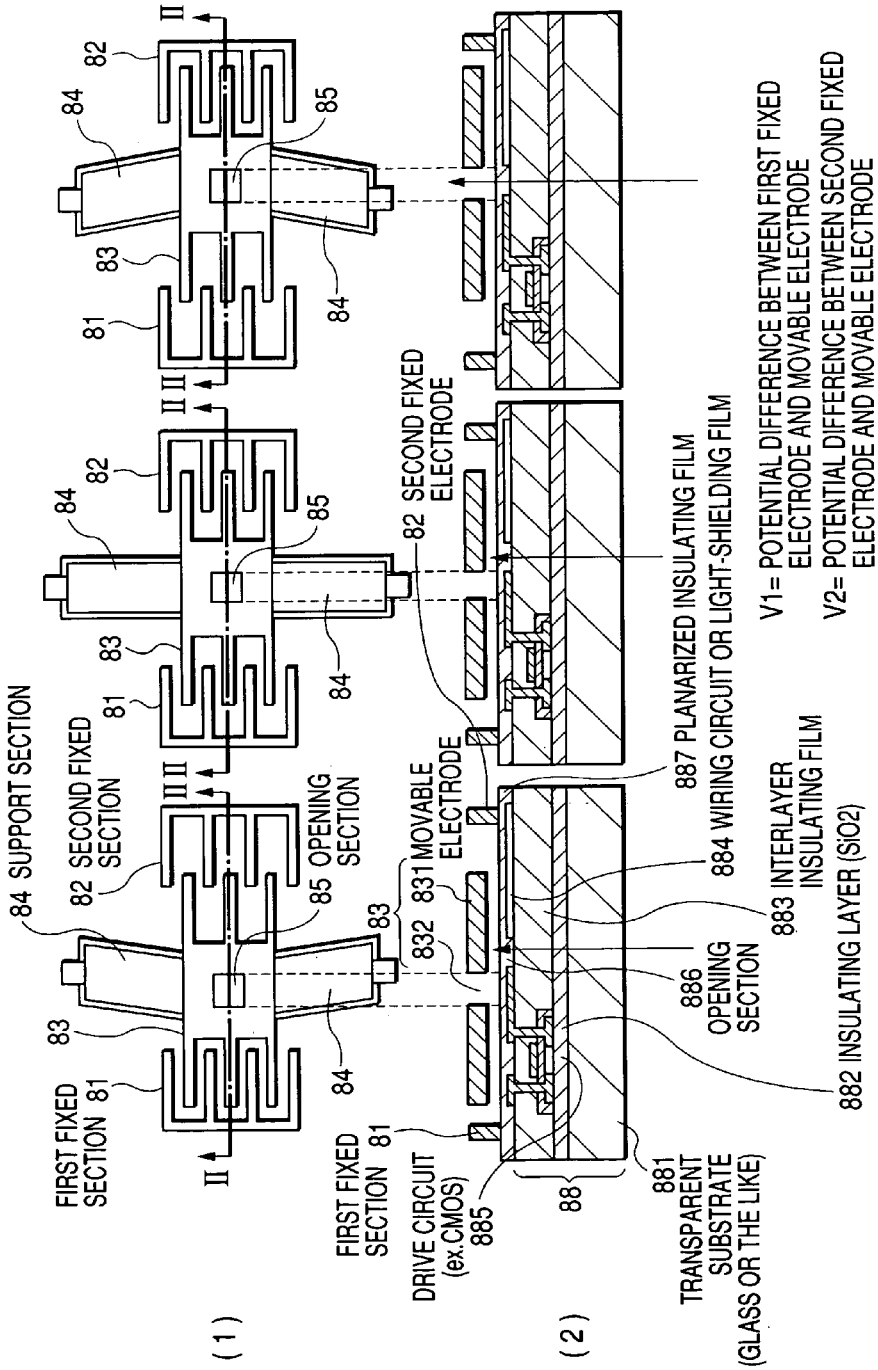

TRANSMISSIVE SPATIAL LIGHT MODULATOR AND METHOD OF MANUFACTURING THE SAME

BACKGROUND OF THE INVENTION

1. Field of the Invention

The present invention relates to a one-dimensional or two-dimensional spatial light modulator array to be provided on an on-demand digital exposure system employed in a photolithography process, an image forming apparatus employing digital exposure, a projection display device such as a projector or the like, and a microdisplay device such as a head-mount display.

2. Description of the Related Art

JP-A-10-39239, JP-A-2002-214543, JP-T-9-510797 and JP-A-7-311391 can be mentioned as known publications in this field.

Among the inventions described in these documents, the invention of JP-A-10-39239 enables provision of a shutter drive circuit or the like on a substrate without involvement of an essential drop in the numerical aperture of the lens, and can be said to be typical of such inventions. To this end, there are provided a microlens for converging light for converging light on an light modulation section formed from a micro-electromechanical element [a micro-electromechanical element formed by means of a micromachine technology is simply called MEM (Micro-Electromechanical) and will be hereinafter referred to as an "MEM light modulation section"]; a substrate on which the light converged by the microlens falls and has a through hole for permitting passage of the light; and a shutter provided on a substrate for controlling passage and blockage of the light having fallen on the through hole.

Such a configuration enables a reduction in the ratio of an opening section of the through hole to the entire surface of the substrate as compared with the ratio of a conventional counterpart without involvement of a drop in the numerical aperture of the lens, assurance of a space to be used for providing a drive circuit or the like on the substrate, a reduction in a distance over which the shutter is actuated, and easy opening and closing action of the shutter by means of electrostatic attractive force.

Therefore, a simpler process can be employed to manufacture a space spatial light modulator which involves little chance of faulty operation. A high-contrast image or the like can be formed on a screen through use of the space spatial light modulator.

An invention of JP-A-2002-214543 is directed toward a device comprising a light-transmission substrate and a circuit panel having a fixed array of transistors, wherein the transistors are fixed to a substrate by means of a bonding layer, connected together by means of conductive row lines and conductive column lines, and connected to an array of pixel electrodes. The device is further provided with liquid-crystal material interposed between a first panel and an opposing electrode of a second panel parallel to the first panel, wherein the first panel is formed from the surface of an essential monocrystal silicon material of the circuit panel. The pixel electrode is positioned between the first panel and the light-transmission substrate, and an electric field or signal-which is generated by the respective electrodes and applied to the liquid-crystal material-changes the optical characteristic of the liquid-crystal material.

An invention of JP-T-9-510797 is directed toward a method for manufacturing an active matrix display. The method comprises: forming an array of transistor circuits through use of a semiconductor layer provided on a first substrate; forming opening sections for limiting pixel electrode areas in the semiconductor layer; forming an array of pixel electrodes in the respective pixel electrode areas; electrically coupling the respective pixel electrodes to one of the transistor circuits; forming an insulation layer on the transistor circuit; forming a light-shielding material on the transistors and the insulation layer; and transferring the transistor circuits, the array of pixel electrodes, and the light-shielding layer from the first substrate to the second substrate. The first substrate is an SOI substrate, and a circuit is transferred on the transparent substrate, whereby an Si substrate is removed by means of etching.

An invention of JP-A-7-311391 is directed toward a method for manufacturing a transmissive LCD device from a high-performance monocrystalline silicon substrate possessing superior field-effect electron mobility. The method comprises: a first step of forming an epitaxial layer of a polycrystalline section in an area on a monocrystalline silicon substrate where pixel openings are to be formed and an epitaxial layer of a monocrystalline section in another area on the monocrystalline silicon substrate; a second step of forming a switching transistor section and a peripheral circuit section for driving purpose on the epitaxial layer of the monocrystalline section and eliminating the epitaxial layer of the polycrystal line section through etching; a third step of forming an embedded layer from transmissive resin in the area from which the epitaxial layer of the polycrystalline section has been removed and subsequently forming a pixel electrode section on the embedded layer; a fourth step of laminating a highly-flat mount glass on the surface of a monocrystalline silicon substrate and adhesively holding the thus-laminated substrate; a fifth step of grinding and abrading a back of the monocrystalline silicon substrate and etching the silicon substrate, as required, to thus expose the back of the embedded layer and form a polycrystalline silicon frame from the epitaxial layer of the monocrystalline section; and a sixth step of laminating the back of the monocrystalline silicon frame to a color filter substrate or a lower glass substrate by means of a transparent adhesive.

However, the invention of JP-A-10-39239 is configured such that an opening section (through hole) for permitting transmission of light is formed in an opaque substrate (e.g., an Si substrate). Hence, the invention suffers from a drawback of a limitation imposed on miniaturization and integrity, as well as complication of a process, thus increasing costs.

Since the invention of JP-A-2002-214543 employs a liquid-crystal element, light originating from a backlight is caused to pass through a plurality of layers, such as a polarizing plate and a filter, thereby raising a problem of a drop in efficiency for light utilization. Further, sealing of liquid crystal between two substrates and orientation of the liquid crystal results in difficulty in increasing the area of the liquid-crystal element. Moreover, light is caused to pass through the orientated liquid-crystal molecules, thereby introducing drawbacks, such as a decrease in the field of view or low responsiveness.

Further, the invention of JP-T-9-510797 also employs a liquid-crystal element, and hence the above-described drawbacks apply to the invention, as well. Further, since the pixel electrode is formed in the opening section, there is no degree of freedom in manufacture, thus posing difficulty in manufacture of the display. Particularly when a microlens array to be described later is used, manufacture of the display becomes difficult. Moreover, since the light-shielding layer and the pixel electrode are indispensable configurations, manufacturing processes become complicated, thus adding to costs.

The invention of JP-A-7-311391 employs a liquid-crystal element as well, and hence the foregoing drawbacks are applied to the invention. Moreover, the method requires the fifth step of forming the monocrystalline silicon frame from the epitaxial layer of the monocrystalline section; and the sixth step for laminating the color filter substrate or the lower glass substrate on the back of the monocrystalline silicon frame by means of a transparent adhesive, and hence manufacturing processes become complicated and costs become high.

SUMMARY OF THE INVENTION

The present invention is to solve the problems and aims at providing an inexpensive, high-performance transmissive spatial light modulator which does not entail formation of a through hole in an Si substrate, and hence involves no limitation on miniaturization and integrity and a simple process, and has the same function as that mentioned previously, as well as providing a method for manufacturing the transmissive spatial light modulator.

To solve the drawbacks, according to a first aspect of the invention, there is provided a transmissive spatial light modulator having a light-transmission area, comprising: a transparent substrate; a pixel drive circuit provided on the transparent substrate to form an area other than the light-transmission area (here, the expression "an area other than the light-transmission area" may be the whole non light-transmission area or part of the non light-transmission area); and a transmissive light modulation section including a micro-electromechanical element, the transmissive light modulation section being controlled by the pixel drive circuit and being provided above the pixel drive circuit.

By means of such a configuration, the entire substrate equipped with the transmissive light modulation section is supported by a transparent substance. Hence, there can be obviated a necessity for forming a through hole in an Si substrate (i.e., an opaque substrate), such as that described in JP-A-10-39239. As a result, a transmissive spatial light modulator which has the same function and is not limited in terms of miniaturization or integrity is obtained through a simple process.

It is noted that "on the transparent substrate" actually refers to both of "directly on the transparent substrate" and "indirectly on the transparent substrate via at least one intermediate such as insulating layer of, e.g., $SiO_2$".

According to a second aspect of the invention, there is provided the transmissive spatial light modulator as set forth in the first aspect of the invention further comprising a microlens array provided integrally on at least an entrance side of an incident light in the transmissive light modulation section so that at least part of the incident light is converged on at least one of the light-transmission area and the light modulation section.

Employment of such a configuration further improves a light-converging characteristic of the transmissive spatial light modulator which is not limited in terms of miniaturization or integrity and has the same function.

According to a third aspect of the invention, there is provided a method of manufacturing a transmissive spatial light modulator by use of an SOI substrate comprising a first silicon layer, an insulation layer and a second silicon layer in this order, the method comprising: forming a pixel drive circuit on the insulation layer, the pixel drive circuit including at least part of the second silicon layer; eliminating the first silicon layer while a portion other than the first silicon layer is supported (e.g., while a pixel drive circuit side is supported); attaching a transparent substrate to the location from which the first silicon layer was removed; and forming a transparent light modulation section including a micro-electromechanical element above the pixel drive circuit.

By means of such a configuration, the entire substrate equipped with the light modulation section is supported by a transparent substance. As a result, there can be produced, through a simple process, a transmissive spatial light modulator which obviates a necessity for forming a through hole in an Si substrate (an opaque substrate), such as that described in JP-A-10-39239, and is not limited in terms of miniaturization and integrity.

According to a fourth aspect of the invention, there is provided method of manufacturing a transmissive spatial light modulator by use of an SOI substrate comprising a first silicon layer, an insulation layer and a second silicon layer in this order, the method comprising: forming a pixel drive circuit including at least part of the second silicon layer on the insulation layer; attaching a transparent substrate to the pixel drive circuit; eliminating the first silicon layer; and newly forming a transmissive light modulation section including a micro-electromechanical element in the area from which the first silicon layer was removed.

By means of such a configuration, as in the case of the manufacturing method in the third aspect of the invention, the entire substrate equipped with the light modulation section is supported by a transparent substance. As a result, there can be produced, through a simple process, a transmissive spatial light modulator which obviates a necessity for forming a through hole in an Si substrate (an opaque substrate), such as that described in JP-A-10-39239, and which is not limited in terms of miniaturization and integrity.

According to a fifth aspect of the invention, there is provided a method of manufacturing a transmissive spatial light modulator, comprising: forming a pixel drive circuit on a transparent substrate through a thin-film transistor (hereinafter called a "TFT") forming process; and forming a transmissive light modulation section including a micro-electromechanical element above the pixel drive circuit.

By means of such a configuration, as in the case of the manufacturing method in the third or fourth aspect of the invention, the entire substrate equipped with the light modulation section is supported by a transparent substance. As a result, there can be produced, through a simple process, a transmissive spatial light modulator which obviates a necessity for forming a through hole in an Si substrate (an opaque substrate), such as that described in JP-A-10-39239, and which is not limited in terms of miniaturization and integrity.

According to a sixth aspect of the invention, there is provided the method of manufacturing a transmissive spatial light modulator as set forth in any of the third to fifth aspects of the invention, wherein a microlens array is provided integrally on at least an entrance side of an incident light in the transmissive light modulation section; and wherein at least part of the incident light is converged on at least one of a light-transmission area of the transmissive spatial light modulator and the light modulation section.

By means of such a configuration, a transmissive spatial light modulator which is not limited in terms of miniaturization or integrity and has a superior light-converging characteristic can be provided through a simple process.

BRIEF DESCRIPTION OF THE DRAWINGS

FIGS. 4H and 4I are views describing processes for forming an MEM light modulation section on a drive circuit and a wiring circuit, both being shown in FIGS. 4A to 4G;

FIGS. 5A to 5C show an example which uses a known comb-shaped electrostatic actuator for a light shutter.

DETAILED DESCRIPTION OF THE INVENTION

First Embodiment

A first embodiment will be described by reference to FIGS. 1A to 1H.

FIGS. 1A to 1H show a method for manufacturing a transmissive spatial light modulator according to a first embodiment of the invention, wherein a silicon circuit is transferred from a back surface to a glass substrate.

Figure 1A:
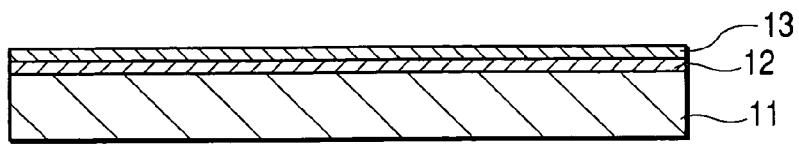
FIGS. 1A to 1I are views describing steps for manufacturing a transmissive spatial light modulator according to a first embodiment of the invention.

In FIG. 1A, a silicon insulator (SOI) substrate is used as a starting substrate. Specifically, as illustrated, the SOI substrate is configured such that an insulating layer 12 of, e.g., $SiO_2$ (silicon dioxide), is provided on an Si (silicon) layer 11 and such that an Si layer 13 is further laid on the insulating layer 12.

Figure 1B:
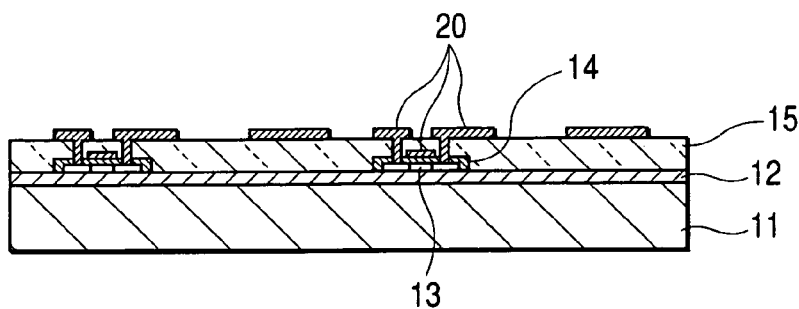

In FIG. 1B, a pixel drive circuit (e.g., CMOS-SRAM) 14 is fabricated through use of the Si layer 13 by means of a normal semiconductor manufacturing process. Reference numeral 15 designates a thin-film transparent insulating film which is formed from $SiO_2$ or a nitride film. A piece 20 provided on the insulating film is a lower electrode of an MEM to be fabricated later and serves as a pixel electrode.

Figure 1C:
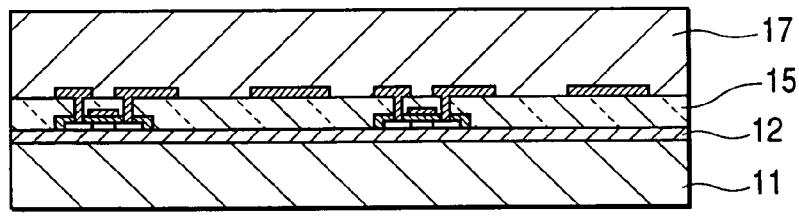

In FIG. 1C, a temporary support 17 is bonded to the transparent insulating film 15 and the lower electrode 16 of the MEM. Glass or resin is suitable for the temporary support 17, and the temporary support 17 is laminated through use of an adhesive tape (not shown).

Figure 1D:
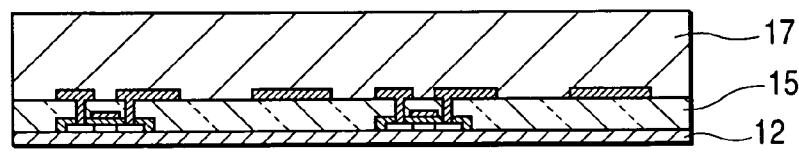

In FIG. 1D, the Si layer 11 is removed while the temporary support 17 is supported. Electro-chemical etching of the Si layer 11 or a grinding/abrading method is employed as a removal method. In addition, the Si substrate can also be exfoliated by means of a lift-off method. For instance, a lift-off layer is formed of the Si layer 11 beforehand, and the lift-off layer is removed in the step shown in FIG. 1D.

Figure 1E:
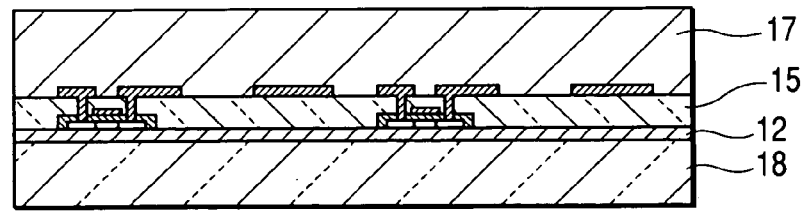

In FIG. 1E, a transparent glass substrate 18 is laminated in place of the removed Si layer 11. As a result, since the entire substrate is supported by a transparent substance, there is obviated a necessity for forming a through hole in the Si substrate (an opaque substrate) such as that described in known JP-A-10-39239.

Figure 1F:
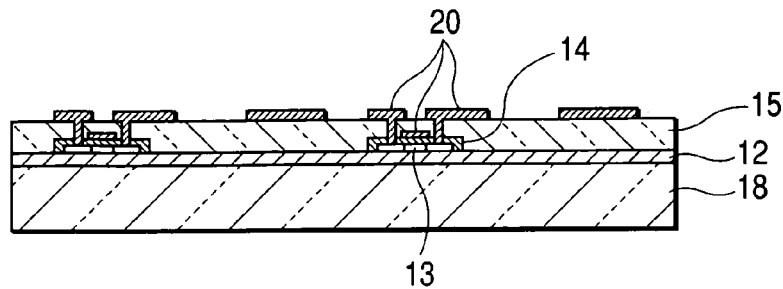

In FIG. 1F, the temporary support 17 supported in the step FIG. 1D and the adhesive tape are exfoliated. After exfoliation, an MEM is to be fabricated in the area from which the temporary support and the adhesive tape have been removed, and hence the surface of the insulating film and that of the lower electrodes are cleansed.

Figure 1G:
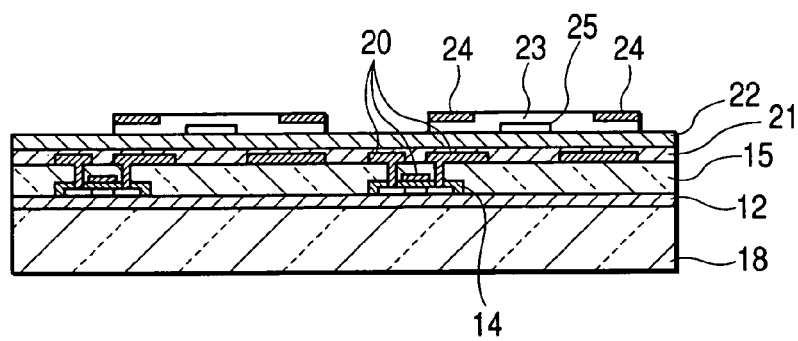

In FIG. 1G, an MEM light modulation section is fabricated. Specifically, reference numeral 20 designates a lower electrode (pixel electrode); 21 designates an optical spacer; 22 designates a sacrificial layer; 23 designates a movable film; 24 designates an upper electrode (common electrode); and 25 designates a half mirror.

Metal, such as aluminum, an aluminum alloy, or MO, polysilicon, or metal silicide is used for the lower electrode 20; a transparent dielectric, such as SiN or $MgF_2$, is used for the optical spacer 21; a glass material, such as $SiO_2$, PSG, BPSG, or SOG, is used for the sacrificial layer 22; SiN is used for the movable film 23; metal, such as aluminum or an aluminum alloy, polysilicon, or metal silicide is used for the upper electrode 24; and a dielectric multilayer film formed from a metal oxide film is used for the half mirror 25. However, the invention is not limited to these materials.

Figure 1H:
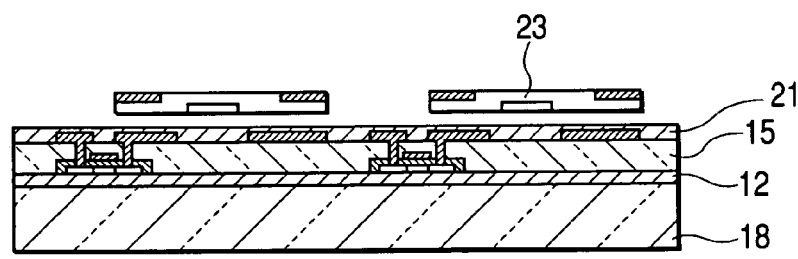

In FIG. 1H, the sacrificial layer 22 is etched away, whereby an MEM substrate is completed.

The MEM light modulation section comprises the lower electrode 20; an insulating support (not shown) interposed between the lower electrode 20 and the movable film 23 to form a gap therebetween; the movable film 23 formed on the insulating supports so as to extend and bridge therebetween; the upper electrode (movable electrode) 24 formed in an extending manner on each of the movable films 23; and the multilayer film 25 formed in the gap. A voltage is imparted between the lower electrode 20 and the upper electrode (movable electrode) 24, thereby moving the movable film 23 in the gap and thereby permitting transmission of light. An spatial light modulator of interference type or a mechanical shutter can be applied to the MEM spatial light modulator, and MEM spatial light modulators of other types are also applicable.

As mentioned above, according to the first embodiment, a pixel drive circuit is fabricated on the SOI substrate. Subsequently, the opaque Si layer is removed, and a transparent glass substrate is provided instead, thereby forming an MEM light modulation section on the pixel drive circuit. Since the entire surface equipped with the MEM light modulation section is supported by the transparent substance, there is obviated a necessity for forming a through hole in the Si substrate (the opaque substrate) such as that described in known JP-A-10-39239. As a result, through a simple process there can be obtained a transmissive spatial light modulator which is not limited in terms of miniaturization and integrity and has the same function.

Figure 1I:
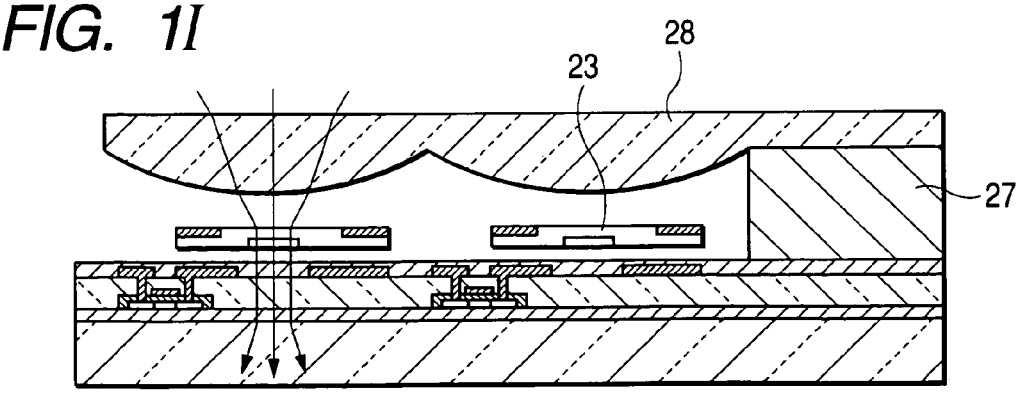

Depending on the application, bonding of a microlens array (MLA) on the MEM light modulation section is also conceivable. Therefore, a step shown in FIG. 1I is provided. In FIG. 1I, a spacer 27 is provided around the MEM light modulation section, and an MLA substrate 28 is attached on the spacer 27. After the space defined in the SOI substrate is filled with a rare gas and then sealed.

Subsequently, the SOI substrate is diced, and the thus-sliced spatial light modulator is mounted by means of bonding electrodes, whereupon formation of the first embodiment is completed.

If an SOI substrate (a quartz substrate or a glass substrate is usually employed as a transparent substrate) formed by laminating transparent substrates is introduced as the SOI substrate, the MEM light modulation section can be formed directly.

Material of the glass substrate and bonding procedures are dependent on a process temperature for the MEM light modulation section.

Dicing may be performed before removal of the sacrificial layer.

In connection with bonding of the MEM spatial light modulator substrate to the MLA substrate, the tolerance of alignment accuracy can be reduced by means of increasing the area of numerical aperture of the MEM light modulation section Second Embodiment A second embodiment of the invention will now be described by reference to FIGS. 2A to 2H.

FIGS. 2A to 2H show a method for manufacturing a transmissive spatial light modulator according to a second embodiment of the invention, wherein a silicon circuit is transferred from a surface to the glass substrate.

Figure 2A:
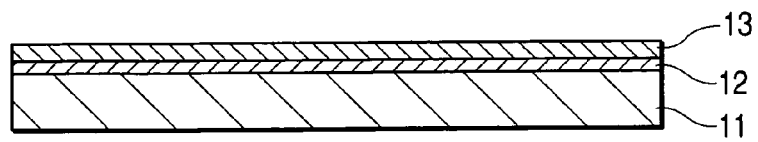
FIGS. 2A to 2H are views describing steps for manufacturing a transmissive spatial light modulator according to a second embodiment of the invention.

In FIG. 2A, a silicon insulator (SOI) substrate is used as a starting substrate. Specifically, as illustrated, the SOI substrate is configured such that the insulating layer 12 of, e.g., $SiO_2$ (silicon dioxide), is provided on the Si (silicon) layer 11 and such that the Si layer 13 is further laid on the insulating layer 12.

Figure 2B:
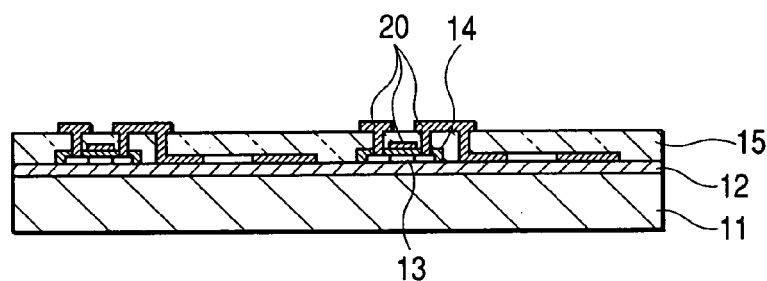

In FIG. 2B, the pixel drive circuit 14 is fabricated through use of the Si layer 13 by means of a normal semiconductor manufacturing process. Reference numeral 15 designates a transparent insulating film which is formed from $SiO_2$ or a nitride film. The piece 20 provided on the insulating film is a lower electrode of an MEM to be fabricated later and serves as a pixel electrode.

Figure 2C:
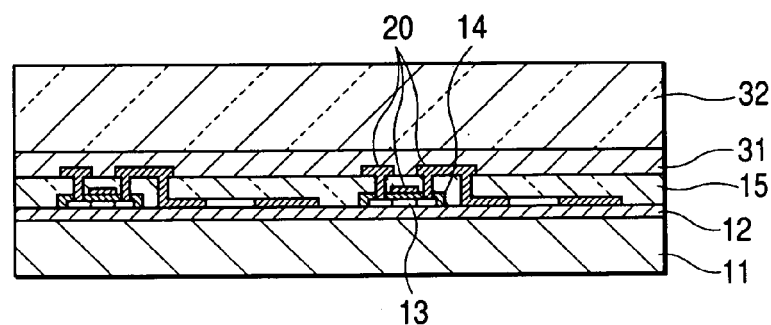

In FIG. 2C, a glass substrate 32 is bonded to the transparent insulating film 15 and the MEM lower electrode 20 via a protective film or a bonding layer 31.

Figure 2D:
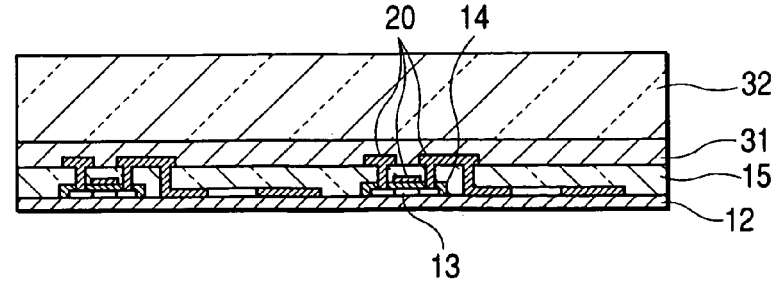

In FIG. 2D, the Si layer 11 is removed. Electro-chemical etching of the Si layer 11 or a grinding/abrading method is employed as a removal method. In addition, the Si substrate can also be exfoliated by means of a lift-off method. For instance, a lift-off layer is formed from the Si layer 11 beforehand, and the lift-off layer is removed.

Figure 2E:
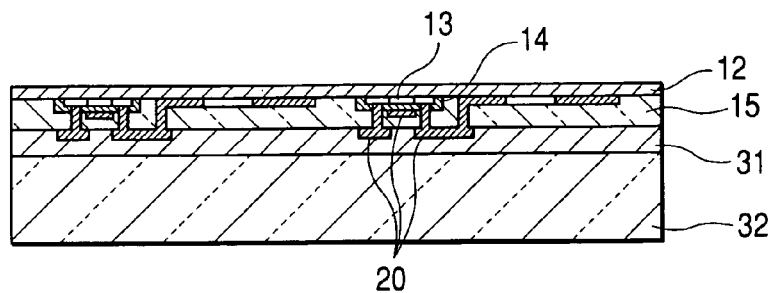

In FIG. 2E, the glass substrate 32 in the state shown in FIG. 2D is situated at a lower position, and the insulating layer 12 is located at a higher position. Since an MEM light modulation section is formed on the insulating layer 12, the surface of the insulating layer is cleansed.

Figure 2F:
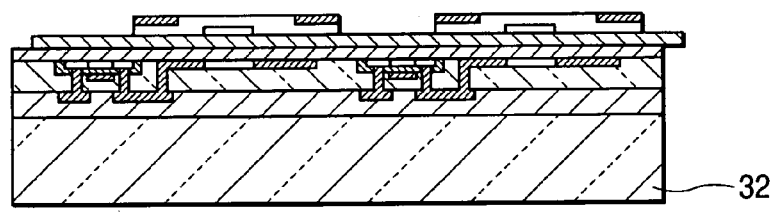

In FIG. 2F, an MEM light modulation section is formed. Specifically, reference numeral 20 designates a lower electrode; 21 designates an optical spacer; 22 designates a sacrificial layer; 23 designates a movable film (e.g., SiN); 24 designates an upper electrode (common electrode); and 25 designates a half mirror (multilayer film).

Figure 2G:
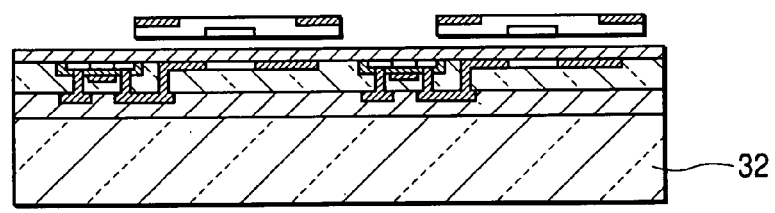

As shown in FIG. 2G, the sacrificial layer 22 is removed, whereupon formation of an MEM substrate is completed.

As mentioned above, according to the second embodiment, the pixel drive circuit is fabricated on the SOI substrate. Subsequently, the transparent glass substrate is provided, and the opaque Si layer is removed, thereby forming an MEM light modulation section on the pixel drive circuit. Since the entire surface equipped with the MEM light modulation section is supported by the transparent substance, there is obviated a necessity for forming a through hole in the Si substrate (the opaque substrate) such as that described in known JP-A-10-39239. As a result, by means of a simple process, there can be obtained a transmissive spatial light modulator which is not limited in terms of miniaturization and integrity and has the same function.

The second embodiment differs from the first embodiment only in that the pixel drive circuit is provided upside down, thereby omitting the processes for bonding and exfoliating the temporary frame.

Figure 2H:
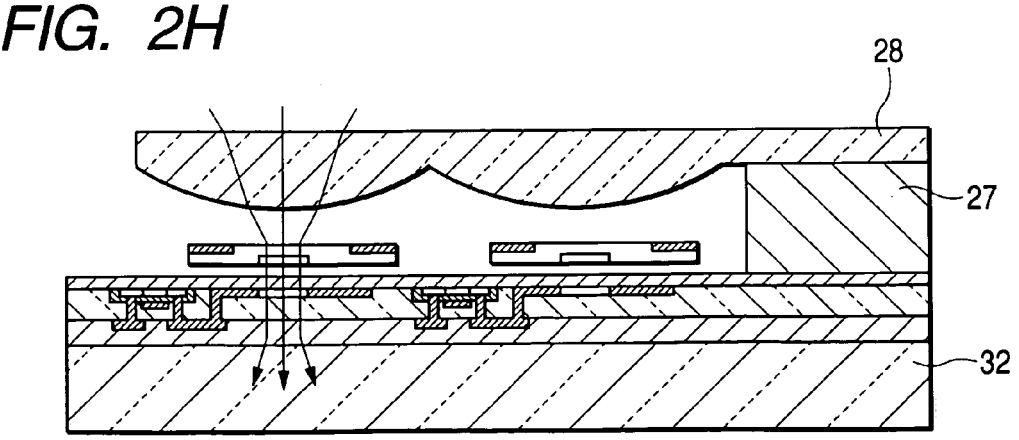

Depending on the application, bonding of the MLA on the MEM light modulation section is also conceivable. Therefore, a step shown in FIG. 2H is provided. In FIG. 2H, the spacer 27 is provided around the MEM light modulation section, and the MLA substrate 28 is attached on the spacer 27. Subsequently, the space defined in the SOI substrate is filled with a rare gas and then sealed.

Subsequently, the substrate is diced, and the thus-sliced spatial light modulator is mounted by means of bonding electrodes, whereupon formation of the second embodiment is completed.

Third Embodiment

A third embodiment of the invention will now be described by reference to FIGS. 3A to 3E.

FIGS. 3A to 3E show a method for manufacturing a transmissive spatial light modulator according to a third embodiment of the invention, wherein a high-temperature polysilicon TFT is fabricated directly on a glass substrate. The polysilicon TFT has high mobility and can fabricate a high-speed circuit such as a drive circuit.

Figure 3A:
FIGS. 3A to 3E are views describing steps for manufacturing a transmissive spatial light modulator according to a third embodiment of the invention.

In FIG. 3A, a quartz substrate 51 is used.

Figure 3B:
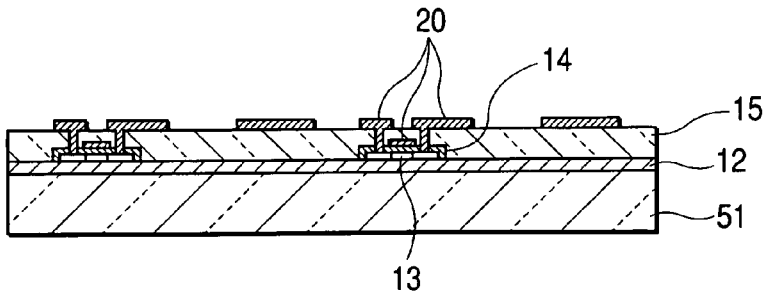

In FIG. 3B, a high-temperature poly-Si TFT is fabricated on the quartz substrate 51.

Figure 3C:
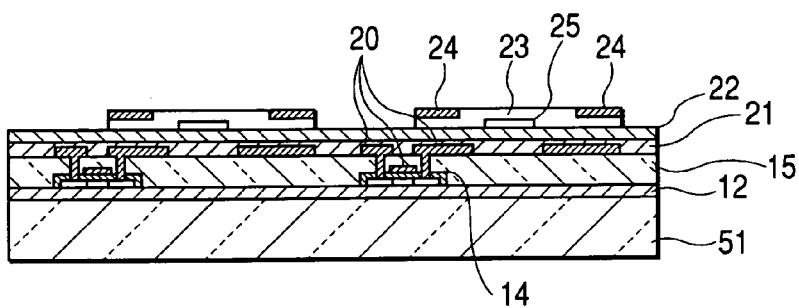

In FIG. 3C, the MEM light modulation section is formed on the high-temperature poly-Si TFT. Specifically, reference numeral 20 designates a lower electrode; 21 designates an optical spacer; 22 designates a sacrificial layer; 23 designates a movable film (e.g., SiN); 24 designates an upper electrode (common electrode); and 25 designates half mirror (multilayer film).

Figure 3D:
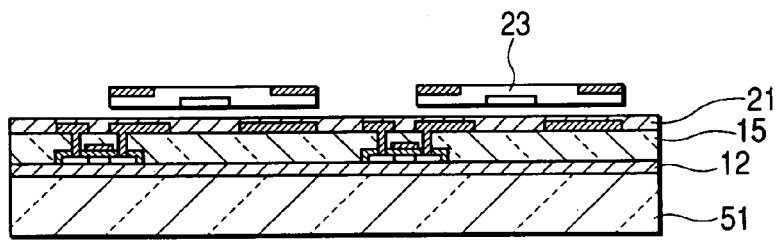

As shown in FIG. 3D, the sacrificial layer 22 is removed, whereupon formation of the MEM substrate is completed.

As mentioned above, according to the third embodiment, the high-temperature polysilicon TFT is fabricated on the glass substrate, and the processes can be omitted significantly.

Further, as in the case of the first and second embodiments, the entire surface equipped with the MEM light modulation section is supported by the transparent substance, and hence there is obviated a necessity for forming a through hole in the Si substrate (the opaque substrate) such as that described in known JP-A-10-39239. As a result, by means of a simple process, there can be obtained a transmissive spatial light modulator which is not limited in terms of miniaturization and integrity and has the same function.

Figure 3E:
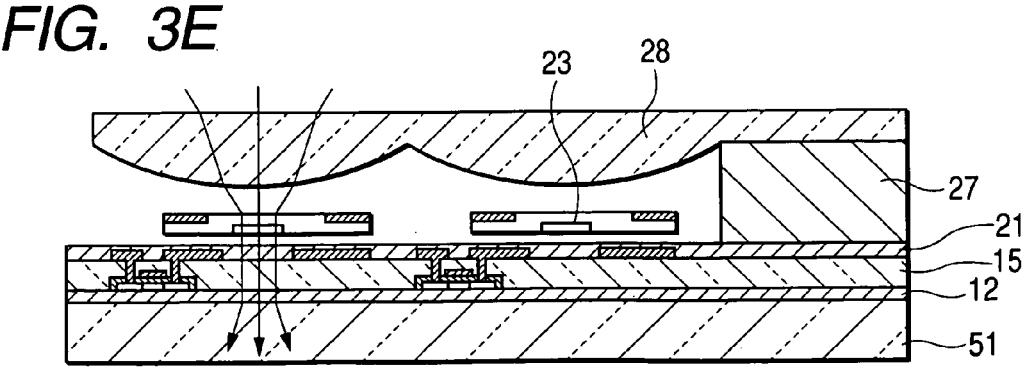

Depending on the application, bonding of the microlens array (MLA) on the MEM light modulation section is also conceivable. Therefore, a step shown in FIG. 3E is provided. In FIG. 3E, the spacer 27 is provided around the MEM light modulation section, and the MLA substrate 28 is attached on the spacer 27. Subsequently, the space defined in the SOI substrate is filled with a rare gas and then sealed.

Subsequently, the substrate is diced, and the thus-sliced spatial light modulator is mounted by means of bonding electrodes, whereupon formation of the third embodiment is completed.

In addition, there may also be adopted a combination of a glass substrate having a low fusing point and a low-temperature poly-si TFT (high mobility transistor).

In addition, CGS or laser annealing may be adopted in place of the low-temperature poly-si TFT. Particularly, as described in JP-A-6-244103, CGS (continuous grain silicon) is an Si film having a superior crystalline characteristic, wherein the CDS film is formed by depositing a trace amount of a certain kind of metal element, such as Ni, on the surface of an amorphous silicon film (hereinafter called an "a-Si" film) and heating the film.

FIG. 4A to 4G show an example of a more specific process for manufacturing a CMOS circuit on the previously-described SOI substrate.

A): A known SOI (Silicon-on-Insulator) substrate 60 is used as a starting substrate. The SOI substrate 60 is formed by means of forming an insulating layer 60b, such as $SiO_2$, on an Si substrate 60a, and forming crystalline Si or an Si thin-film layer 60c equivalent to the crystalline Si on the insulating layer 60b. The SOI substrate can be produced by means of various manufacturing methods. However, a typical, known manufacturing method includes a recrystallizing method, an epitaxial growth method, an insulating film embedding method (SIMOX, FIPOS, or the like), or a laminating method. Any of these are usable.

The thickness of the insulating layer 60b has a value ranging from 200 nm to 2 μm; and the thickness of the Si thin-film layer 60c assumes a value ranging from 100 nm to tens of micrometers. The thickness of the Si thin-film layer 60c employed for forming a CMOS circuit preferably assumes a value ranging from 100 nm to 500 nm or thereabouts.

When compared with a CMOS circuit fabricated from a conventional bulk Si substrate, the CMOS circuit formed from such a SOI substrate 60 is characterized by being superior in high-speed responsiveness, high-pressure tightness, and high integrity.

B): Because of lateral isolation of the transistor element, there is employed a LOCOS method which selectively oxidizes a portion of a semiconductor substrate through thermal oxidation, to thereby form a field oxide film 61 in an element isolated region.

C): Impurity ions B+, P+ are implanted into the Si region, to thus form a p-type Si semiconductor 62p and an n-type Si semiconductor region 62n.

D): A gate oxide film ($SiO_2$) 63a is formed on the region of the p-type Si semiconductor 62p and that of the n-type Si semiconductor 62n, through thermal oxidation or the like, and subsequently the poly-Si film is grown through CVD or the like. The film is then patterned through RIE or the like, to thus fabricate a gate electrode 63b. Subsequently, an insulating film ($SiO_2$) is grown through CVD, and sidewalls 63c are formed on both sides of the gate electrode through RIE or the like.

E): A high concentration of impurity ions P+ and a high concentration of impurity ions B+ are implanted into the p-type Si semiconductor region and the n-type Si semiconductor region through self-alignment by utilization of the sidewalls, whereby a source region 64s and a drain region 64d are formed from an $n^+$-type Si semiconductor and a $p^+$-type Si semiconductor. Subsequently, in order to establish reliable electrical connection with a metal wiring layer to be described later, a silicide layer is formed on an upper portion of the gate electrode, an upper portion of the source region, and an upper portion of the drain region (not shown). As a result, an n-type MOS-FET (65n) and a p-type MOS-FET (65p) are fabricated.

F): There is formed metal wiring (aluminum or the like) 67 which is connected to the gate electrode, the source region, and the drain region by way of an interlayer insulating film 66 (such as PSG, BPSG, or a silicon nitride film) formed through CVD or the like.

As shown in G), the interlayer insulating film 66 and the metal wiring 67 may be stacked as an interlayer insulating film 66' and a metal wiring 67' in accordance with a circuit configuration and the degree of integrity.

As mentioned above, a desired CMOS circuit is fabricated, and the CMOS circuit acts as a circuit for controlling and driving an MEM spatial light modulator to be described later.

Figure 4A:
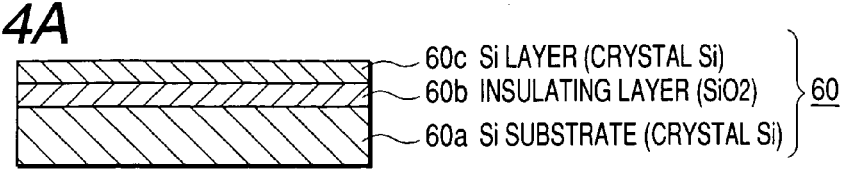
FIGS. 4A to 4G are views showing an example of specific processes for manufacturing a CMOS circuit through use of an SOI substrate.
Figure 4B:
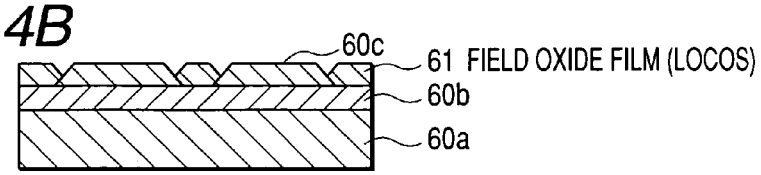
Figure 4C:
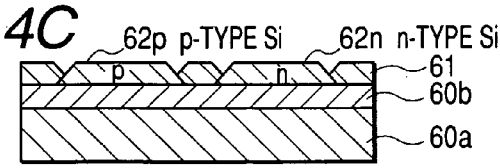
Figure 4D:
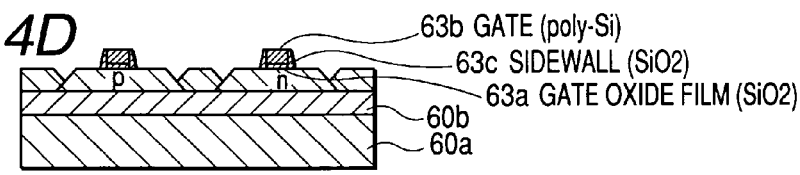
Figure 4E:
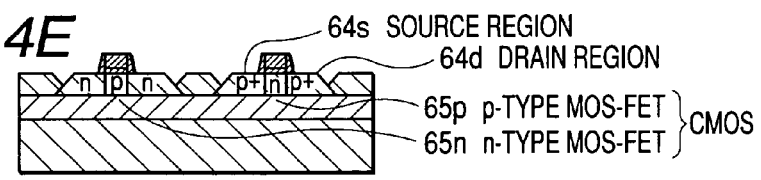
Figure 4F:
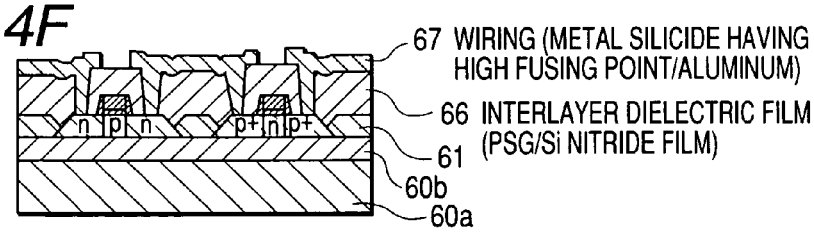
Figure 4G:
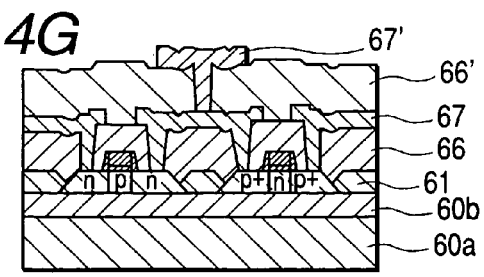

FIGS. 4H and 4I is a view for briefly describing a process for forming an MEM light modulation section on the drive circuit and the wiring circuit shown in FIGS. 4A to 4G.

First, an insulating film ($SiO_2$ or the like) 71, which is to act as a base material for the MEM light modulation section, is formed on the drive circuit and the wiring circuit. Subsequently, there is provided a contact hole 72 (shown in FIG. 4I) to be used for connecting an output wire of the drive circuit with a drive electrode of the MEM spatial light modulator, and metal 73 is embedded in the contact hole. In order to achieve high flatness, the insulating film and the embedded metal layer are made flat through CMP, as required.

I): The MEM spatial light modulator is fabricated.

H): The insulating film ($SiO_2$ or the like) 71, which is to act as a base material of the MEM light modulation section, is provided on the drive circuit and the wiring circuit. Subsequently, the contact hole 72 (FIG. 1), which is to be used for connecting the output wiring of the drive circuit to the drive electrode of the MEM spatial light modulator, is provided, and the contact hole is embedded with the metal 73. In order to achieve high flatness, the insulating film and the embedded metal layer are made flat through CMP, as required.

I): The MEM spatial light modulator is formed.

The MEM spatial light modulator assumes various structures and modes according to an application. The embodiment shows an MEM spatial light modulator of a mechanical light shutter based on Comb (comb) drive (the mechanical shutter per se based on the comb drive will be described later). The MEM spatial light modulator of the mechanical shutter based on a comb drive comprises a fixed electrode 74, and a partially-supported movable electrode 75, and the movable electrode 75 is formed from a light-shielding section 75a and an opening section 75b. Reference numeral 76 designates a protective film. The fixed electrode 74 and the movable electrode 75 are connected to respective outputs of the drive circuit of the base, and the movable electrode 75 is displaced in a direction horizontal to the substrate by means of application of a voltage between the fixed electrode 74 and the movable electrode 75. When the movable electrode 75 has been deflected rightward in the drawing by means of the displacing movement, the incident light L enters the opening section 75b and passes through the same (see (a) of FIG. 4I). When the movable electrode 75 has been deflected leftward in the drawing, the incident light L falls on the light-shielding section 75a, whereby the light is blocked (see (b) of FIG. 4I). Thus, light modulation is performed.

Here, the MEM spatial light modulator may be formed on the lower drive circuit or on any area other than the lower drive circuit. Here, the light modulation area is provided in the area (transparent region) other than the lower drive circuit, and the incident light is not blocked by the drive circuit.

In relation to a manufacturing method, an SiN film, which is to act as an etching protective layer, is grown through CVD, and an $SiO_2$ (or PSG, BPSG, or SOG), which is to act as a sacrificial layer, is grown through CVD or the like.

Subsequently, the fixed electrode formation area is removed through etching.

Next, the poly-Si layer, which is to form the fixed electrode and the movable section (including the movable electrode), is grown through CVD.

Subsequently, the poly-Si layer is patterned through photolithography etching, thereby forming the fixed electrode and the movable section (including the movable electrode) in desired patterns.

Finally, the sacrificial layer ($SiO_2$ or the like) is etched away through use of HF or the like, to thus fabricate the MEM spatial light modulator. It is preferable to perform super critical drying through use of $CO_2$ so that the movable section is not affixed to the substrate during a drying process after elimination of the sacrificial layer.

FIGS. 5A to 5C show an example in which a known comb-type electrostatic actuator is used for the light shutter. It is noted that (1) of FIG. 5A, (1) of FIG. 5B and (1) of FIG. 5C show top views of the example, and (2) of FIG. 5A, (2) of FIG. 5B and (2) of FIG. 5C show cross sectional views of (1) of FIG. 5A, (1) of FIG. 5B and (1) of FIG. 5C along the line II—II, respectively.

By means of the manufacturing method of the invention, a drive circuit 885 is formed on a transparent substrate (e.g., a glass substrate, a quartz substrate, a sapphire substrate or the like) 881 (See (2) of FIG. 5A, (2) of FIG. 5B and (2) of FIG. 5C) via an insulating layer ($SiO_2$ or the like) 882. For instance, the drive circuit can be realized by means of a transistor circuit fabricated through an Si process, particularly, a CMOS circuit. An interlayer insulating film 883, a wiring circuit 884, and a planarized insulating film 887 are arranged. At this time, the light-shielding members, such as the drive circuit 885 and the wiring circuit 884, are arranged in an area other than a light-transmission section 886. A transparent material, such as that of the insulating layer (e.g., silicon oxide or silicon nitride), is formed in the light-transmission section 886.

An actuator section is formed on the drive circuit 885 and the planarized insulating film 887.

An illustrated embodiment is an example of the light shutter employing a comb-type electrostatic actuator, and the shutter comprises a first fixed electrode 81, a second fixed electrode 82, a movable electrode 83, and a support section 84 for supporting the movable electrode 83 on a substrate 88.

As can be seen from the drawings, the first fixed electrode 81, the second fixed electrode 82, and the movable electrode 83 are formed such that mutually-opposing sides of the first fixed electrode 81 and the movable electrode 83 and mutually-opposing sides of the second fixed electrode 82 and the movable electrode 83 are formed into such a shape that each of the sides has comb-shaped projections and recesses and such that the teeth of the combs are meshed with each other such that the teeth do not contact each other. By means of such a configuration, effective drive force can be induced by even a small drive voltage.

The movable electrode 83 is preferably formed from a conductive material, such as metal or semiconductor, but may be formed from a combination of insulating material and conductive material. The electrodes are connected to outputs of the drive circuits 885 provided on the substrate 88 via the wiring circuit 884, and potentials of the respective electrodes can be controlled arbitrarily.

FIGS. 5A to 5C show a case where light falls on the lower side of the substrate 88 (i.e., a downward direction in the drawing).

In this case, there is provided the light-shielding layer 884, wherein the opening section 886 is provided on the side of the light-shielding layer 884 facing the transparent substrate 881. The movable electrode 83 is displaced toward the optical path passing through the opening section 886, to thereby align either the light-shielding section 883 or the opening section 832 and to thus control the light shutter.

The light-shielding function of the substrate and that of the movable electrode may be embodied as either a light-absorbing characteristic or a light-reflecting characteristic. Preferably, a superior light reflection characteristic is achieved, and generation of heat, which would otherwise be caused by absorption, can be prevented. Further, in the case of the light-reflecting characteristic, a multilayer film mirror is preferably provided in addition to a semiconductor.

Operation of the light shutter will be described by reference to the embodiment shown in FIGS. 5A to 5C.

Potential differences between the electrodes are assumed to be as follows:

V1=a potential difference between the first fixed electrode 81 and the movable electrode 83, V2=a potential difference between the second fixed electrode 82 and the movable electrode 83.

A): When V1>V2, the movable electrode 83 is displaced toward the first fixed electrode 81 (See FIG. 5A).

At this time, the opening section 886 of the substrate overlaps the light-shielding section 831 of the movable electrode 83, thereby blocking the light L.

B): When V1=V2, the movable electrode 83 becomes stable between the first fixed electrode 81 and the second fixed electrode 83 (See FIG. 5B).

At this time, the opening section 886 overlaps the light-shielding section 831 of the movable electrode 83, thereby blocking the light L.

C): When V1<V2, the movable electrode 83 is displaced toward the second fixed electrode 82 (See FIG. 5C).

At this time, the opening section 886 of the substrate matches the opening section 832 of the movable electrode 83, thereby permitting passage of the light L.

The above descriptions are provided for the embodiment, and the configuration, method, material, and driving method of the mechanical light shutter may be modified, so long as they comply with the gist of the invention. For instance, a flap-type shutter is also effective, wherein a rotationally-displaceable light-shielding film is rotationally displaced, to thereby permit passage of incident light or block the incident light.

Further, although in the embodiment the transparent member, such as an insulating film, is formed in the optical path of the light-transmission section 886 of the substrate 88, a gap may be employed. In this case, the gap can be formed readily by means of etching the insulating film at an area on the light-transmission section 886.

Light may be caused to enter the shutter from the side opposite the substrate.

As mentioned above, the present invention renders the transmitted light path transparent by forming the drive circuit and the wiring circuit in an area other than the transmitted light path, as required.

Accordingly, the transmitted light path is not made transparent by forming a through hole in an opaque substrate (e.g., an Si substrate), as practiced in the related art, and hence processes can be simplified. Further, areas to be used for fabricating the drive circuits and the modulation elements can be utilized effectively.

Particularly, the SOI substrate is taken as a known starting substrate, and drive circuits are fabricated by means of a known method. Subsequently, the drive circuit section is transferred onto the transparent substrate (e.g., a glass substrate), whereby the semiconductor drive circuit can be readily fabricated at arbitrary positions on the transparent substrate.

The drive circuits fabricated in the SOI substrate are also superior to the drive circuit fabricated from a bulk Si substrate in terms of integrity, a high-speed characteristic, and high pressure tightness.

Even when a transparent substrate (e.g., a glass substrate) is taken as a starting substrate and a drive circuit based on a known TFT is fabricated, a semiconductor drive circuit can be fabricated readily at an arbitrary position on the transparent substrate. Particularly, according to the technique, such as CGS, a high-mobility TFT corresponding to crystalline Si can be readily implemented through low-temperature processes, as well. Hence, the processes can be simplified significantly, and costs of the glass substrate can be reduced further.

Figure 6:
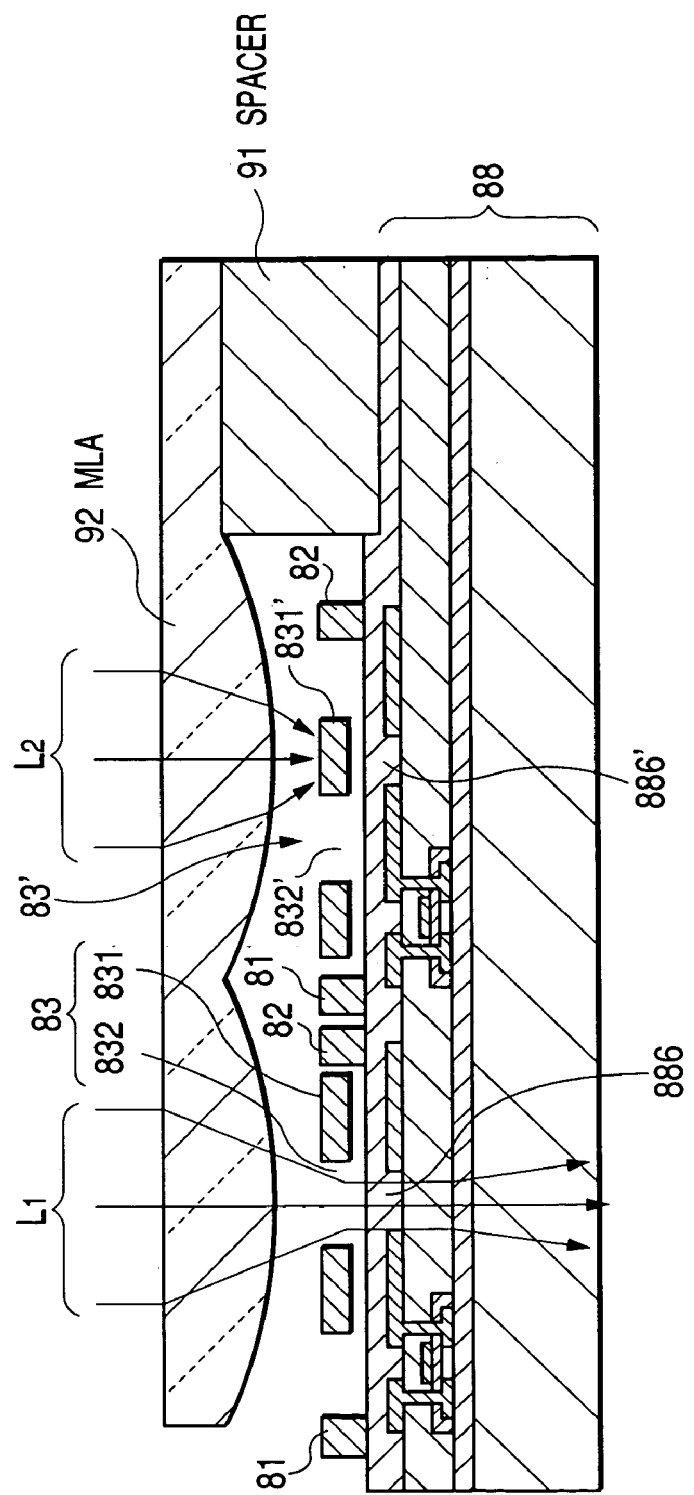
FIG. 6 shows an example in which a microlens array is provided on an entrance-side of an incident light in an spatial light modulator.

FIG. 6 is a view showing an example in which the microlens (hereinafter called an "MLA") is provided at the entrance side of an incident light in the spatial light modulator.

In the drawing, the previously-described comb-shaped electrostatic actuator is disposed on the SOI substrate 88 formed from the drive circuit (e.g., CMOS). When an opening section 832 formed in the movable electrode 83 that can be displaced horizontally between the first fixed electrode 81 and the second fixed electrode 82 coincides with the opening section 886 of the substrate 88, the light L1 becomes transparent light. When the light-shielding section 831' coincides with the opening section 886' of the substrate 88, the light L2 is blocked.

In this case, the number, shape, and size of projection lenses of the MLA 92, the interval between the lenses, and a distance between opening section 886 and the distance (i.e., height from a spacer 91) are determined such that a collimated light ray falling on the substrate 88 at right angles is converted on the respective opening sections 886.

Therefore, the majority of the collimated light ray reaching the substrate 88 at right angles is converted on the respective opening sections 886, thereby enabling effective utilization of light.

As has been described, the present invention renders the transmitted light path transparent by forming the drive circuit and the wiring circuit in an area other than the transmitted light path, as required. Accordingly, the transmitted light path is not made transparent by forming a through hole in an opaque substrate (e.g., an Si substrate), as practiced in the related art, and hence processes can be simplified. Further, areas to be used for fabricating the drive circuits and the modulation elements can be utilized effectively. Particularly, the SOI substrate is taken as a known starting substrate, and drive circuits are fabricated by means of a known method. Subsequently, the drive circuit section is transferred onto the transparent substrate (e.g., a glass substrate), whereby the semiconductor drive circuit can be readily fabricated at arbitrary positions on the transparent substrate. The drive circuits fabricated in the SOI substrate are also superior to the drive circuit fabricated from a bulk Si substrate in terms of integrity, a high-speed characteristic, and high pressure tightness.

The entire disclosure of each and every foreign patent application from which the benefit of foreign priority has been claimed in the present application is incorporated herein by reference, as if fully set forth.

What is claimed is:

1. A transmissive spatial light modulator having a light-transmission area, comprising:
    a transparent substrate;
    a pixel drive circuit provided on the transparent substrate to form an area other than the light-transmission area; and
    a transmissive light modulation section including a micro-electromechanical element, the transmissive light modulation section being controlled by the pixel drive circuit and being provided above the pixel drive circuit.

2. The transmissive spatial light modulator according to claim 1, further comprising a microlens array provided integrally on at least an entrance side of an incident light in the transmissive light modulation section so that at least part of the incident light is converged on at least one of the light-transmission area and the light modulation section.

3. The modulator of claim 1, wherein the transparent substrate comprises light transmissive glass.

4. The transmissive spatial light modulator according to claim 1, wherein the pixel drive circuit controls the transmission of light through the light-transmission area.

5. A method of manufacturing a transmissive spatial light modulator by use of an SOI substrate comprising a first silicon layer, an insulation layer and a second silicon layer in this order, the method comprising:
    forming a pixel drive circuit on the insulation layer, the pixel drive circuit including at least part of the second silicon layer;
    eliminating the first silicon layer while a portion other than the first silicon layer is supported;
    attaching a transparent substrate to the location from which the first silicon layer was removed; and
    forming a transparent light modulation section including a micro-electromechanical element above the pixel drive circuit.

6. The method of manufacturing a transmissive spatial light modulator according to claim 5, wherein a microlens array is provided integrally on at least an entrance side of an incident light in the transmissive light modulation section; and wherein at least part of the incident light is converged on at least one of a light-transmission area of the transmissive spatial light modulator and the light modulation section.

7. The method of claim 5, wherein the transparent substrate comprises light transmissive glass.

8. The method of claim 5, wherein eliminating the first silicon layer comprises removing a thickness of the first silicon layer across a surface of the first silicon layer.

9. A method of manufacturing a transmissive spatial light modulator by use of an SOI substrate comprising a first silicon layer, an insulation layer and a second silicon layer in this order, the method comprising:
    forming a pixel drive circuit including at least part of the second silicon layer on the insulation layer;
    attaching a transparent substrate to the pixel drive circuit;
    eliminating the first silicon layer; and
    newly forming a transmissive light modulation section including a micro-electromechanical element in the area from which the first silicon layer was removed.

10. The method of manufacturing a transmissive spatial light modulator according to claim 9, wherein a microlens array is provided integrally on at least an entrance side of an incident light in the transmissive light modulation section; and wherein at least part of the incident light is converged on at least one of a light-transmission area of the transmissive spatial light modulator and the light modulation section.

11. The method of claim 9, wherein the transparent substrate comprises light transmissive glass.

12. The method of claim 9, wherein eliminating the first silicon layer comprises removing a thickness of the first silicon layer across a surface of the first silicon layer.

13. A method of manufacturing a transmissive spatial light modulator, comprising:
forming a pixel drive circuit on a transparent substrate through a thin-film transistor forming process; and
forming a transmissive light modulation section including a micro-electromechanical element above the pixel drive circuit.

14. The method of manufacturing a transmissive spatial light modulator according to claim 13, wherein a microlens array is provided integrally on at least an entrance side of an incident light in the transmissive light modulation section; and wherein at least part of the incident light is converged on at least one of a light-transmission area of the transmissive spatial light modulator and the light modulation section.

15. The method of claim 13, wherein the transparent substrate comprises light transmissive glass.

* * * * *